(12) United States Patent
Arciero et al.

(10) Patent No.: US 6,572,070 B2
(45) Date of Patent: Jun. 3, 2003

(54) EXHAUST SYSTEM HANGER ISOLATOR

(75) Inventors: Carlo Arciero, Livonia, MI (US);
Christopher Stephen Figueira, Canton, MI (US); Glenn Richard Reed, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,601

(22) Filed: Sep. 26, 2001

(65) Prior Publication Data
US 2003/0057348 A1 Mar. 27, 2003

(51) Int. Cl.[7] .......................... F16M 13/00; E21F 17/02
(52) U.S. Cl. .......................... 248/610; 248/60; 248/634
(58) Field of Search ................................. 248/610, 611, 248/635, 634, 58, 60; 267/292, 281

(56) References Cited

U.S. PATENT DOCUMENTS

| 2,160,808 | A |   | 6/1939  | Bradley     |         |
|-----------|---|---|---------|-------------|---------|
| 3,147,964 | A | * | 9/1964  | Wolf        | 267/292 |
| 3,642,268 | A | * | 2/1972  | Hipsher     | 267/281 |
| 3,851,673 | A |   | 12/1974 | Merkle et al. | |
| 3,888,439 | A |   | 6/1975  | Tuttle      |         |
| 3,942,599 | A |   | 3/1976  | Shimada     |         |
| 4,116,411 | A | * | 9/1978  | Masuda      | 248/60  |
| 4,377,216 | A | * | 3/1983  | Ueno        | 280/124.108 |
| 4,522,378 | A |   | 6/1985  | Nelson      |         |
| 4,638,965 | A | * | 1/1987  | De Bruine et al. | 248/59 |
| 4,799,288 | A |   | 1/1989  | Kimizawa    |         |
| 4,817,909 | A | * | 4/1989  | Deane       | 248/610 |
| 4,893,778 | A | * | 1/1990  | Drabing et al. | 248/610 |
| 5,190,269 | A | * | 3/1993  | Ikeda et al. | 267/140.12 |
| 5,295,652 | A | * | 3/1994  | Byrne       | 248/635 |
| 5,398,907 | A | * | 3/1995  | Kelchner    | 248/634 |
| 5,673,877 | A | * | 10/1997 | Karner et al. | 248/58 |
| 5,823,261 | A |   | 10/1998 | Drumheller  |         |
| 5,873,429 | A |   | 2/1999  | Qutub       |         |
| 6,029,785 | A |   | 2/2000  | Koivunen    |         |
| 6,058,562 | A |   | 5/2000  | Satou et al. |        |
| 6,095,460 | A |   | 8/2000  | Mercer et al. |       |
| 6,354,614 | B1 | * | 3/2002 | Ham et al.  | 280/124.11 |

FOREIGN PATENT DOCUMENTS

JP          11-280460        * 10/1999

* cited by examiner

Primary Examiner—Anita King

(57) ABSTRACT

An exhaust system hanger isolator supports exhaust system components on a vehicle in a manner to reduce noise and vibration. The isolator includes a bracket having first and second apertures formed therethrough at opposing ends of the bracket. First and second rubber grommets are received within the first and second apertures, respectively. The first and second rubber grommets have chamfered ends to facilitate push-in insertion into the apertures, and the first and second rubber grommets each have a central opening to receive headed attachment rods therein.

11 Claims, 3 Drawing Sheets

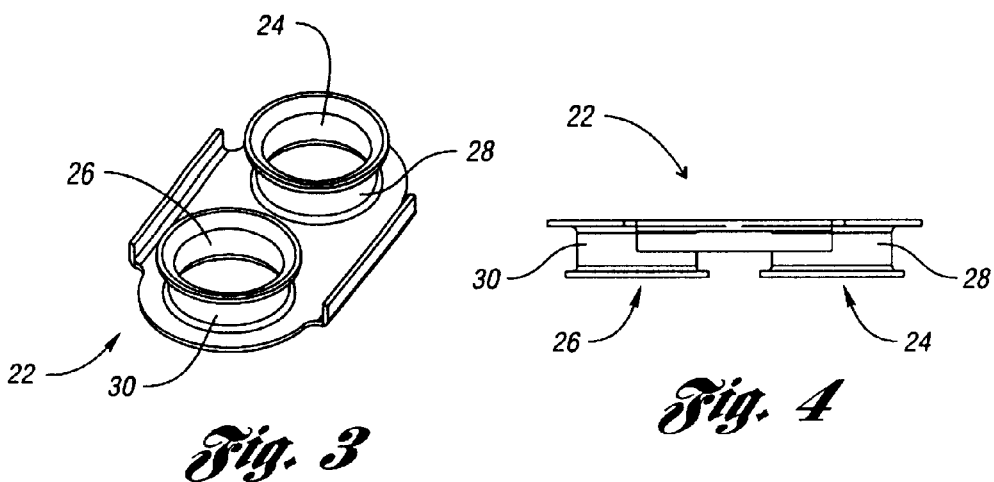
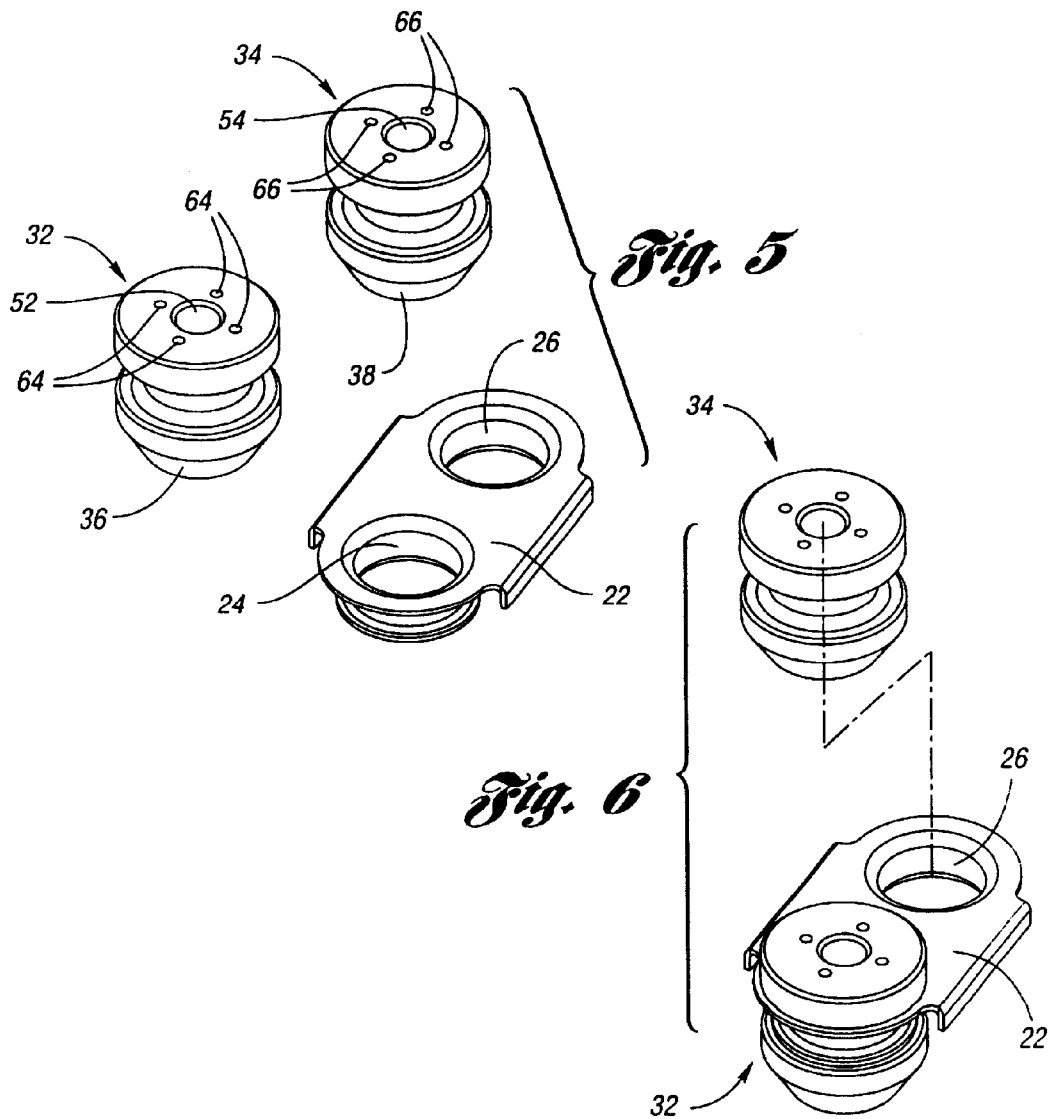

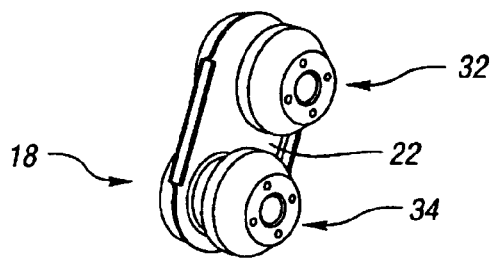
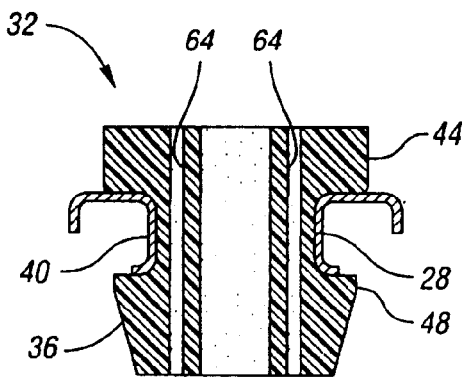
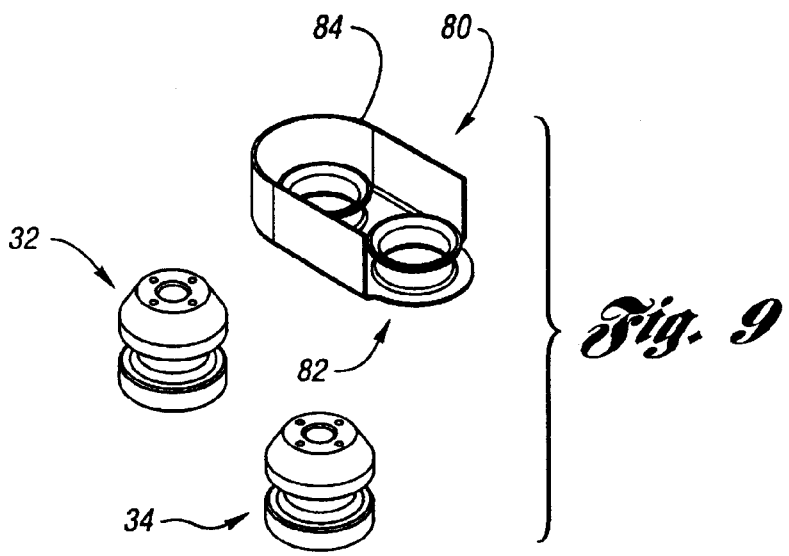
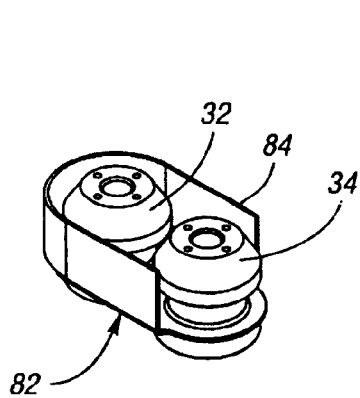
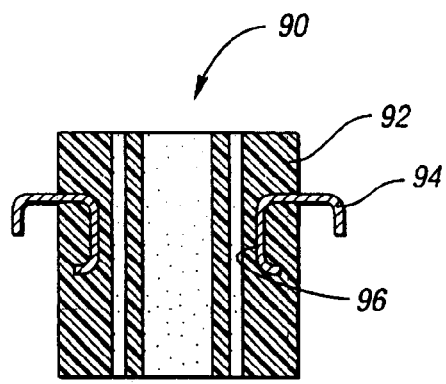

EXHAUST SYSTEM HANGER ISOLATOR

BACKGROUND OF INVENTION

1. Field of the Invention

The present invention relates to an exhaust system hanger isolator which includes a steel bracket with first and second apertures formed therethrough at opposing ends, and having first and second rubber grommets received within the first and second apertures, respectively, for supporting exhaust system components on a vehicle in a manner to reduce noise and vibration.

2. Background Art

Exhaust pipes and mufflers in motor vehicles require a flexible support structure that will permit the exhaust system to expand and contract longitudinally along with changes in temperature. This flexible support structure must also insulate or isolate the exhaust system from the vehicle frame to prevent noise and vibration from being transmitted to the frame from the exhaust system.

It is desirable that such an exhaust system hanger isolator be inexpensive to manufacture and assemble while providing improved vibration isolation tunability and improved overall vibration isolation performance characteristics.

SUMMARY OF INVENTION

The present invention provides an exhaust system hanger isolator for supporting exhaust system components on a vehicle in a manner to reduce noise and vibration, wherein the isolator includes a steel bracket having first and second apertures formed therethrough at opposing ends of the bracket with first and second rubber grommets received within the first and second apertures, respectively, such that the rubber grommets are always in compression, rather than tension, thereby minimizing rubber material usage and enabling the use of very soft rubber grommet materials for improved performance. Preferably, the rubber grommets have chamfered ends to facilitate push-in insertion into the apertures. Also, the rubber grommets each include a central opening to receive a headed attachment rod which is pushed into the central opening for ease of assembly.

The bracket may be a single piece stamping which may include an integral heat shield formed as part of the single piece to shield the grommets from exhaust system heat, thereby further enabling the use of alternative grommet materials. The bracket is preferably a stamped galvanized steel, such as SAE 1008 or SAE 1018. Alternatively, the bracket could be a sintered metal or high temperature plastic.

The bracket design having apertures at opposing ends also enables the use of rubber grommets of different durometer at opposing ends of the bracket to enable tuning of noise and vibration isolation. Tuning may be further enhanced by providing cored holes in the grommets.

It is further contemplated that the exhaust system hanger isolator could have one, two or numerous rubber grommets, depending upon the particular design requirements. The rubber grommets may be injection or compression molded, and may comprise a EPDM or silicon rubber material. However, the term rubber grommets is used herein to refer to any elastic compressible material.

Accordingly, an object of the invention is to provide an improved exhaust system isolator having reduced manufacturing and assembly costs, tunable vibration isolation characteristics, and enhanced vibration isolation performance.

The above object and other objects, features and advantages of the present invention are readily apparent from the following detailed description of the best modes for carrying out the invention when taken in connection with the accompanying drawings.

BRIEF DESCRIPTION OF DRAWINGS

FIG. 3 shows a perspective view of an isolator bracket corresponding with FIG. 1;

FIG. 4 shows a side view of the isolator bracket of FIG. 3;

FIG. 5 shows an exploded perspective view of an isolator in accordance with the embodiment of FIG. 1;

FIG. 6 shows a partially assembled perspective view of the isolator of FIG. 5;

FIG. 7 shows an assembled perspective view of the isolator of FIG. 5;

FIG. 8 shows a cross-sectional view of the isolator of FIG. 7;

FIG. 9 shows an exploded perspective view of an isolator in accordance with a first alternative embodiment of the invention;

FIG. 10 shows an assembled perspective view of the isolator of FIG. 9; and

FIG. 11 shows a sectional view of an isolator in accordance with a second alternative embodiment of the invention.

DETAILED DESCRIPTION

Figure 1:
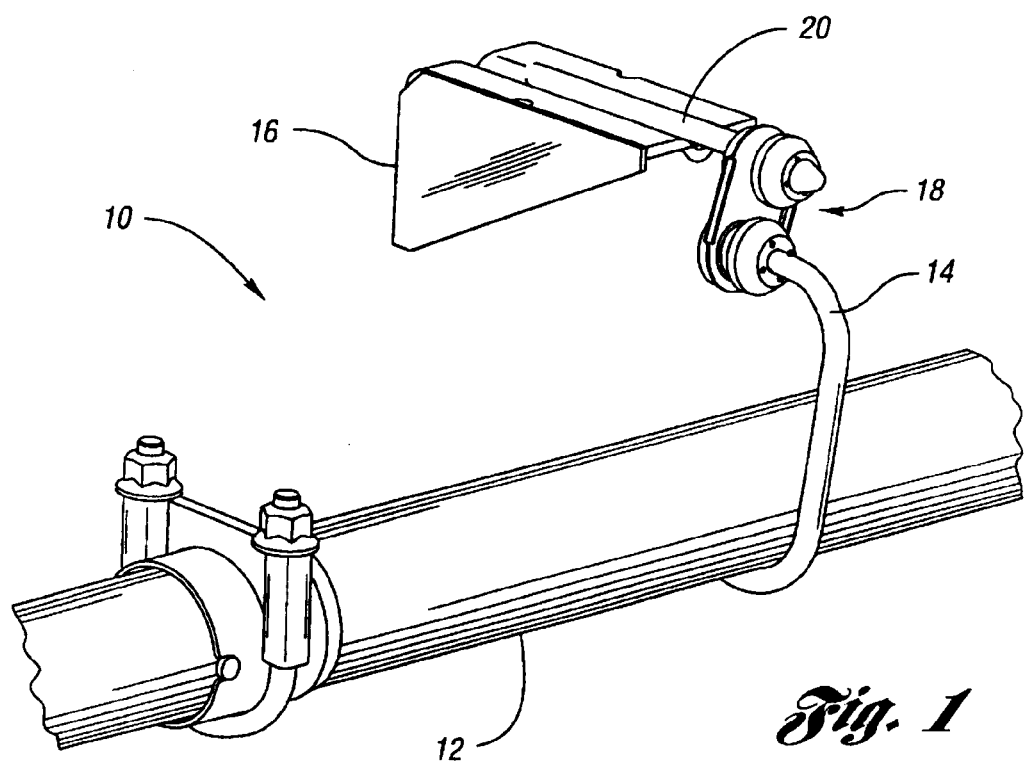
FIG. 1 shows a partial perspective view of an exhaust system with an isolator in accordance with the present invention.

Referring to FIG. 1, a perspective view of an exhaust system 10 is shown. The exhaust system 10 includes an exhaust pipe 12 which is supported by a hanger rod 14, which is secured to the vehicle frame 16 by an isolator 18, which is attached to a support rod 20.

As shown in FIGS. 1–8, the isolator 18 in accordance with the preferred embodiment of the invention includes a stamped steel bracket 22 having first and second apertures 24,26 formed therethrough at opposing ends of the bracket 22 by extruded hollow bosses 28,30, respectively.

Referring to FIGS. 5–8, first and second rubber grommets 32,34 are pushed into the apertures 24,26, respectively. The chamfered ends 36,38 of the grommets 32,34, respectively, enable the grommets to be pushed into the apertures 24,26 in the bracket 22.

Figure 2:
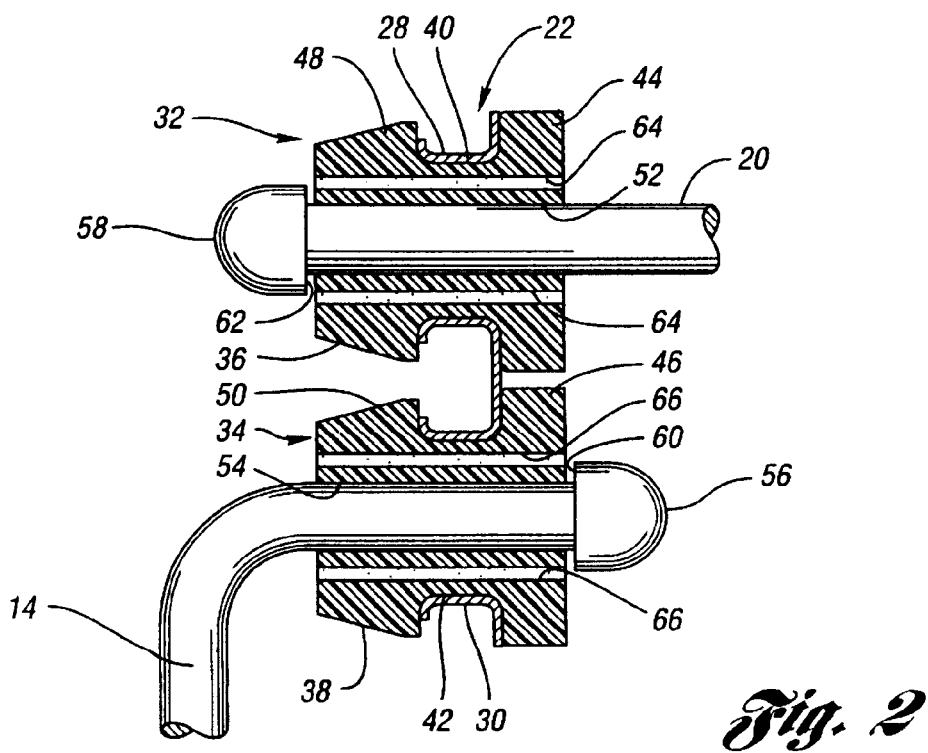
FIG. 2 shows a longitudinal cross-sectional view of the isolator assembly shown in FIG. 1.

As shown in FIG. 2, the rubber grommets 32,34 each include a middle groove 40,42 to receive the extruded bosses 28,30 of the bracket 22. The middle grooves 40,42 are bordered by first and second ring-shaped portions 44,46,48, 50.

The rubber grommets 32,34 also each include a central opening 52,54 therethrough, respectively. The central openings 52,54 are configured to receive the support rod 20 and hanger rod 14, respectively. These rods 14,20 each include an enlarged, rounded head 56,58, respectively, to facilitate push-in insertion through the central apertures 52,54. Each enlarged head 56,58 includes a flat shoulder 60,62 to prevent the heads 56,58 from exiting through the central openings 52,54 after assembly.

Accordingly, as a result of the chamfered lead in edges 36,38 of the grommets, the grommets may be pushed into the bracket apertures 24,26, and as a result of the rounded configuration of the rod heads 56,58, the rods 14,20 may be pushed into the central openings 52,54, thereby eliminating the need for rivets, welds, or other attachment features.

As also shown in FIGS. 2 and 8, the grommets 32,34 include cored holes 64,66. These cored holes 64,66 may be formed by a core pin in an injection molding or compression molding process. These cored holes may be used to tune the vibration and noise isolation characteristics of the grommets. Of course, the number, shape and size of the cored holes could vary considerably within the scope of the present invention.

Also, the grommets 32,34 could comprise different materials with respect to each other for tuning of vibration isolation (i.e., the isolator could have a soft grommet at one end and a hard grommet at another end).

Referring to FIGS. 9 and 10, an isolator 80 is shown in accordance with a first alternative embodiment of the invention. This embodiment is in all other respects similar to that described above with reference to FIGS. 1–8, except that the bracket 82 includes an integral heat shield 84 formed therewith integrally in a metal stamping operation. The heat shield 84 protects the rubber grommets 32,34 from exhaust system heat. Accordingly, less heat resistant rubber materials may be used, further reducing design cost. By integrally stamping the heat shield 84 into a single piece component with the bracket 82, manufacturing and assembly costs are minimized.

FIG. 11 shows a cross-sectional view of an isolator 90 in accordance with a second alternative embodiment of the invention wherein the rubber grommet 92 is insert molded with the bracket 94. This insert molding process eliminates the need to press the grommet 92 into the aperture 96.

While the best modes for carrying out the invention have been described in detail, those familiar with the art to which this invention relates will recognize various alternative designs and embodiments for practicing the invention within the scope of the appended claims.

What is claimed is:

1. An exhaust system hanger isolator, comprising: a bracket having first and second apertures formed therethrough at opposing ends of the bracket, the bracket including first and second extruded bosses, the bosses forming said first and second apertures; and first and second rubber grommets received within said first and second apertures, respectively, said first and second rubber grommets having chamfered ends to facilitate push-in insertion into the apertures, and said first and second rubber grommets each having a central opening to receive headed attachment rods therein.

2. The exhaust system hanger isolator of claim 1, wherein said first and second rubber grommets include a plurality of holes formed therethrough for improved isolation of exhaust system vibrations.

3. The exhaust system of claim 1, wherein said first and second grommets comprise rubber materials, and the rubber material of said first grommet is different from the rubber material of said second grommet to enable tuning of vibration isolation.

4. The exhaust system hanger isolator of claim 1, wherein said first and second rubber grommets each include a groove configured to receive the first and second extruded bosses.

5. An exhaust system hanger isolator, comprising:
a bracket having first and second apertures formed therethrough at opposing ends of the bracket; and
first and second rubber grommets received within said first and second apertures, respectively, said first and second rubber grommets having chamfered ends to facilitate push-in insertion into the apertures, and said first and second rubber grommets each having a central opening to receive headed attachment rods therein;

wherein said bracket comprises a single piece stamping with an integral heat shield formed as part of the single piece to shield the grommets from exhaust system heat.

6. An exhaust system hanger isolator for supporting exhaust system components on a vehicle in a manner to reduce noise and vibration, the isolator comprising:
a steel bracket having first and second apertures formed therethrough at opposing ends of the bracket, the bracket including first and second extruded bosses, the bosses forming said first and second apertures; and first and second rubber grommets received within the first and second apertures, respectively, said first and second rubber grommets each having a central opening to receive an attachment rod therein; wherein said first and second rubber grommets are insert molded with the steel bracket.

7. The exhaust system hanger isolator of claim 6, wherein said first and second rubber grommets include a plurality of holes formed therethrough for improved isolation of exhaust system vibrations.

8. The exhaust system of claim 6, wherein said first and second grommets comprise rubber materials, and the rubber material of said first grommet is different from the rubber material of said second grommet to enable tuning of vibration isolation.

9. The exhaust system hanger isolator of claim 6, wherein said first and second rubber grommets each include a groove configured to receive the first and second extruded bosses.

10. An exhaust system hanger isolator for supporting exhaust system components on a vehicle in a manner to reduce noise and vibration, the isolator comprising:
a steel bracket having first and second apertures formed therethrough at opposing ends of the bracket; and
first and second rubber grommets received within the first and second apertures, respectively, said first and second rubber grommets each having a central opening to receive an attachment rod therein;
wherein said first and second rubber grommets are insert molded with the steel bracket;
wherein said steel bracket comprises a single piece stamping with an integral heat shield formed as part of the single piece to shield the grommets from exhaust system heat.

11. An exhaust system hanger assembly for supporting exhaust system components on a vehicle in a manner to reduce noise and vibration, the hanger assembly comprising:
a stamped steel bracket having first and second apertures formed therethrough at opposing ends of the bracket;
first and second rubber grommets received within the first and second apertures, respectively, and said first and second rubber grommets each having a central opening;
a headed support rod inserted through the central opening of one of said grommets and attachable to the vehicle;
a headed hanger rod inserted through the other of said grommets and attachable to an exhaust system component; and
wherein said steel bracket is a single piece stamping with an integral heat shield formed as part of the single piece to shield the grommets from exhaust system heat.

* * * * *